United States Patent Office 3,200,094
Patented Aug. 10, 1965

3,200,094
REMOISTENABLE ADHESIVE COMPOSITIONS AND METHOD FOR MAKING THE SAME
William W. Sederlund, Berkeley Heights, N.J., and Carl D. Marotta, Southampton, Pa., assignors to National Starch and Chemical Corporation, New York, N.Y., a corporation of Delaware
No Drawing. Filed Mar. 14, 1962, Ser. No. 179,784
5 Claims. (Cl. 260—29.6)

This invention relates to water remoistenable adhesive compositions, substrates coated therewith, and to methods for producing the same.

So-called remoistenable adhesives are commonly utilized in the production of tapes, labels, wall paper, envelopes, and similar products wherein it is desired to provide a dry adhesive film which on being moistened with water will become tacky and thereby allow for the ready adhesion of the thus coated product to a variety of substrates. In the manufacture of remoistenable adhesive products, it is the usual practice to prepare an aqueous solution or dispersion of the dry adhesive material, which is commonly called the "gum." After applying a film of the dispersed gum to a paper or other substrate, the water is evaporated and the resulting dry, continuous film of gum material will, on being moistened with water, produce the desired tacky, adhesive surface.

A difficulty commonly encountered in working with remoistenable adhesive coated papers is that of "curl." Since the paper backing and the continuous adhesive film exhibit different rates of expansion on absorbing atmospheric moisture, or different rates of contraction on losing moisture, the gummed papers may curl or roll up on exposure to varying conditions of humidity. In order to minimize the detrimental effects resulting from the dissimilar expansion or contraction rates of the adhesive film and the paper substrate, an attempt is usually made to produce a discontinuous adhesive surface. The latter is often accomplished by mechanically breaking the continuous surface into smaller sections. This rather harsh procedure often damages the paper sheet, and moreover, the mechanical breaking method is not altogether effective in preventing curl.

It is an object of this invention to provide a method of producing remoistenable adhesive compositions and substrates coated therewith, whose excellent dimensional stability provides freedom from curl. It is another object of this invention to provide an effective and economical method of producing remoistenable adhesive products. A further object of this invention is to provide remoistenable adhesive products that possess superior binding and processing properties. Other objects and the advantages of this invention will be apparent from the discussion that follows hereinafter.

In accordance with the preferred embodiment of this invention, discrete particles of a remoistenable adhesive material are suspended in a solution of a water insoluble binder dissolved in a blend of a volatile water-miscible solvent and a relatively small amount of water, said blend being one which does not act as a solvent for the remoistenable adhesive material. In another embodiment of the invention, water may be entirely excluded from the blend, and under these conditions, it is not necessary, of course, that the solvent for the binder be water miscible. In either case, the resulting adhesive formulation is then coated on a paper or other substrate, the resulting coating dried in order to remove the volatile solvent or the aqueous solvent blend, and thereby yielding a substrate coated with discrete particles of remoistenable adhesive bonded to each other and to the substrate by means of the water-insoluble binder. The use of our binder-solvent combinations allows a degree of binding power to be realized that is far superior to that obtained by using other binders. Their use has also been found to prevent settling of the suspended remoistenable adhesives and thereby facilitates processing of the adhesive product. Thus, the products obtained by the process of this invention exhibit efficient remoistening ability, improved processing characteristics, and outstanding resistance to curl.

We have found that particularly effective results are obtained by employing polyvinyl alcohol, derived from partially hydrolyzed polyvinyl acetate, as the water-insoluble binder for the adhesives of our invention. When dissolved in a water:solvent blend, this material serves as a highly efficient binder for remoistenable adhesives. In some cases, hereinafter described, a water miscible or immiscible solvent may be used by itself to dissolve the polyvinyl alcohol.

The binder polymer may be dissolved in a solvent blend of the desired water:solvent ratio, and thereafter blended with the water soluble dispersed phase. Alternatively, the polyvinyl alcohol may be furnished as an aqueous suspension of high solids content. Solvent is then added to the suspension until the desired water:solvent ratio is reached and the polyvinyl alcohol dissolved. The dispersed phase is then added. The resulting dispersion of the remoistenable adhesive material may then be coated onto a substrate in accordance with practices well-known in the coating art whereupon the solvent mixture may be evaporated, leaving a dried, consolidated coating comprising particles of adhesive material bound together and to the substrate by the polyvinyl alcohol.

It is preferred that polyvinyl alcohol which is made by hydrolyzing polyvinyl acetate to a degree of between about 15% and about 60% be used as the binder for the remoistenable adhesives of our invention. Such polyvinyl alcohol will be hereinafter described as containing from about 85% to about 40% of residual unhydrolyzed acetate groups, i.e., from about 85% to about 40% of the number of acetate groups originally contained in the polyvinyl acetate. For purposes of brevity and convenience, the residual unhydrolyzed acetate groups of the polyvinyl alcohol will hereinafter be referred to simply as acetate groups. Within this preferred range, the polyvinyl alcohol which contains a lesser percent of acetate groups will exhibit greater binding strength for the adhesive material. Polyvinyl alcohol covering a wide range of molecular weights may be used. For example, we have used polyvinyl alcohol derived from polyvinyl acetate ranging in intrinsic viscosity from about 0.15 to about 2.0. Higher molecular weight polyvinyl alcohol forms stronger films and exhibits better binding ability. The polyvinyl alcohol used in this invention is not soluble in water, but dissolves in the solvents or solvent mixtures employed in the process of this invention.

In general, the solvent blends employed to dissolve the binder and to suspend the remoistenable adhesive are water:alcohol combinations. The proportion of water required in the solvent blend to insure solution of the polyvinyl alcohol will depend on the molecular weight of the polyvinyl alcohol, the percent of acetate groups in the polyvinyl alcohol, and the particular organic solvent system used. Thus, water has been entirely excluded in some instances, for example, where polyvinyl alcohol containing from 62% to 57% of acetate groups is dissolved in absolute methanol. Any of the lower alcohols, such as methanol, ethanol, or isopropanol may be used in our procedure. The aforementioned alcohols are, in fact, particularly desirable for use in this invention since they are miscible with water and can dissolve polyvinyl alcohol. However, it is to be noted that other solvents such as ketones, esters, and the like can be utilized in our solvent mixtures. Some grades of polyvinyl alcohol are soluble in solvents such as ketones or esters containing no added alcohol or water. The solubility of the polyvinyl alcohol in such solvents depends on the molecular weight of the polyvinyl alcohol and the degree of hydrolysis of the polyvinyl acetate. When a solvent system is used which contains an organic solvent in addition to alcohol, the polyvinyl alcohol may be furnished as a lacquer in the solvent wherein the polyvinyl acetate was originally hydrolyzed. The dispersed phase is then added to the lacquer. The amount of alcohol or other organic solvent employed in our solvent mixtures is limited only by the solubility of the polyvinyl alcohol in the organic solvent. The amount of water employed in our solvent mixtures is also limited by solubility considerations. Thus, if the upper limit of water content is exceeded, coagulation or lumping of the dispersed remoistenable adhesive is likely to occur. On the other hand, enough water must be included in the solvent mixture to dissolve the polyvinyl alcohol, unless, of course, water may be excluded from the solvent, as may occur in cases similar to that previously indicated. In general, we have found that the purposes of our invention are adequately fulfilled by employing water:alcohol mixtures containing at least approximately 85% ethyl alcohol or isopropyl alcohol. Polyvinyl alcohol having an acetate group content of from 85% to 40% can be dissolved quite readily in 95:5 ethyl alcohol:water mixtures. When methyl alcohol is used, a slightly higher percentage of the latter is necessary in the solvent mixture than is necessary with the other alcohols in order to avoid lumping of the dispersed adhesive material.

The water:alcohol solvent mixtures described hereinabove offer several advantages in the practice of the process of this invention. These solvent mixtures are more efficient dispersing agents for the remoistenable adhesive than an unmodified organic solvent. Also, the use of a slight amount of water in the mixture mitigates the flash hazard that is often presented by the use of organic solvents. Moreover, the inclusion of ethanol in the combination reduces the problem of toxicity commonly present when other types of organic solvents are used.

The amount of dispersed remoistenable material employed in the formulations of this invention may vary considerably and is not a factor which is critical to our invention. There must be sufficient binding resin to hold the dispersed adhesive material to the sheet effectively, but the proportion of binding resin must not be so large as to interfere with proper remoistening. We have obtained particularly good remoistenable products by employing ratios of dispersed phase:binder ranging from 4:1 to 12:1.

The material which is used as the remoistenable adhesive in the process of our invention may be selected from a variety of adhesive materials. It is necessary only that the adhesive material be dispersed in the solvent or solvent blend without coagulation and that, on evaporation of the solvent, it becomes tackified when moistened with water. Among the materials that may be employed as the remoistenable adhesive are included: natural gums, such as seaweed extracts, gum arabic, gum tragacanth, locust bean gum, and the like; starches, such as corn, sago, wheat, rice, sweet potato, sorghum, waxy sorghum, waxy maize, potato or tapioca, as well as components of these starches, such as amylose or amylopectin, and the conversion products and derivatives of the aforementioned starches, such as starch ethers, starch esters, dextrins, and the like; cellulose derivatives, such as methyl cellulose, carboxymethyl cellulose, hydroxyethyl cellulose, and the like; and proteinaceous materials, such as animal glue and water activatable casein derivatives. The starches and starch derivatives mentioned hereinabove must be water soluble or water remoistenable. These characteristics may be effected by either pregelatinization or by the particular method which is used to convert the starch.

Various reagents or additives may be incorporated in our adhesive products in order to enhance certain properties thereof. Plasticizers may, for example, be used to impart greater flexibility to the binder. Also, some additives may be included in the dispersed phase in order to improve tack, facilitate wetting, and provide a longer range, that is, to extend the time after remoistening during which the adhesive remains tacky.

Other advantages of our compositions reside in the improved techniques which they make possible in the manufacture of remoistenable adhesive products. In the preferred embodiment of our invention, the inclusion of water in the solvent mixture for the polymeric binder not only helps to prevent settling of the dispersed adhesive particles, but also lessens the flash hazard commonly presented by the use of concentrated organic solvents. The remoistenable adhesives obtained by means of the process of our invention can be employed in a variety of applications. So-called "lay-flat" gummed papers commonly used in preparing labels, decals, wallpaper, envelopes, and similar products are especially suitable for manufacture with the adhesives of our invention.

The following examples, in which all parts given are by weight unless otherwise noted, will further illustrate the embodiment of our invention.

*Example I*

This example illustrates the production by means of the process of our invention of a remoistenable adhesive product exhibiting a high degree of dimensional stability.

The following procedure was employed, with some variation, in each formulation given in this example.

In this basic procedure, the polymer is dissolved in a solvent blend, and water soluble powdered material is dispersed in the solution of the polymer. The resulting dispersion is then coated onto a paper substrate and, on evaporation of the solvent blend, an adhesive coating which becomes tacky on moistening is otbained.

(a) 3 parts of dry polyvinyl alcohol containing 60% of acetate groups were dissolved in a 34:6 ethanol:water blend. To the aforementioned solution were added 36 parts of a corn dextrin. The resulting dispersion of dextrin in the polymer solution was coated onto a paper base, and the solvent thereupon evaporated, leaving a dried, consolidated coating comprising discrete particles of dextrin bound by the polyvinyl alcohol.

(b) 6 parts of a 50% solids aqueous dispersion of polyvinyl alcohol containing 60% of acetate groups were mixed with 34 parts of ethanol and agitated until solution of the polymer occurred. To the aforementioned solution were added 36 parts of finely ground animal glue. The resulting dispersion of animal glue in the polymer solution was coated onto a paper base, and the solvent thereupon evaporated, leaving a dried, consolidated coating comprising discrete particles of animal glue bound by the polyvinyl alcohol.

(c) The procedure of Example I(a) was followed with the exception that a 38.5:1.5 ethanol:water blend was employed. A product exhibiting remoistenable adhesive properties was obtained.

(d) The procedure of Example I(a) was followed with the exception that the ethanol was replaced by isopropanol. A product having remoistenable adhesive properties was obtained.

(e) The procedure of Example I(b) was followed with the exception that the ethanol was replaced by isopropanol. A product having remoistenable adhesive properties was obtained.

(f) 3 parts of dry polyvinyl alcohol containing 60% of acetate groups were dissolved in a 39:1 methanol:water blend. To the aforementioned solution were added 36 parts of a corn dextrin. The resulting dispersion of dextrin in the polymer solution was coated onto a paper base, and the solvent thereupon evaporated, leaving a dried, consolidated coating comprising discrete particles of dextrin bound by the polyvinyl alcohol.

(g) 3 parts of dry polyvinyl alcohol containing 85% of acetate groups and 0.3 part of diethyl phthalate were dissolved in a 34:6 ethanol:water blend. To the aforementioned solution were added 30 parts of a corn dextrin. The resulting dispersion of dextrin in the polymer solution was coated onto a paper base, and the solvent thereupon evaporated, leaving a dried, consolidated coating comprising discrete particles of dextrin bound by the polyvinyl alcohol.

(h) 3 parts of dry polyvinyl alcohol containing 40% of acetate groups and 0.3 part of propylene glycol were dissolved in a 34:6 ethanol:water blend. To the aforementioned solution were added 36 parts of a tapioca dextrin. The resulting dispersion of dextrin in the polymer solution was coated onto a paper base, and the solvent thereupon evaporated, leaving a dried, consolidated coating comprising discrete particles of dextrin bound by the polyvinyl alcohol.

*Example II*

This example illustrates the use of various solvents and solvent combinations to dissolve the water insoluble binder in the process of our invention.

(a) 3 parts of dry polyvinyl alcohol containing 62% of acetate groups were dissolved in 30 parts of methanol. To the aforementioned solution were added 30 parts of a corn dextrin. The resulting dispersion of dextrin was coated onto a paper base, and the solvent thereupon evaporated, leaving a dried, consolidated coating comprising discrete particles of dextrin bound by the polyvinyl alcohol.

(b) 3 parts of dry polyvinyl alcohol containing 54% of acetate groups were dissolved in a 30:10:2 methanol:toluene:water blend. To the aforementioned solution were added 36 parts of a corn dextrin. The resulting dispersion of dextrin was coated onto a paper base, and the solvent thereupon evaporated, leaving a dried, consolidated coating comprising discrete particles of dextrin bound by the polyvinyl alcohol.

(c) 3 parts of dry polyvinyl alcohol containing 58% of acetate groups were dissolved in a 20:20:2 methanol:methyl acetate:water blend. To the aforementioned solution were added 36 parts of a corn dextrin. The resulting dispersion of dextrin was coated onto a paper base, and the solvent thereupon evaporated, leaving a dried, consolidated coating comprising discrete particles of dextrin bound by the polyvinyl alcohol.

(d) 36 parts of dry polyvinyl alcohol containing 58% of acetate groups were dissolved in 109 parts of methyl ethyl ketone, and 4 parts of butyl phthalyl butyl glycollate were also added to the solution. To the aforementioned solution were added 160 parts of a corn dextrin. The resulting dispersion of dextrin was coated onto a paper base, and the solvent thereupon evaporated, leaving a dried, consolidated coating comprising discrete particles of dextrin bound by the polyvinyl alcohol.

Any departure from the above description which conforms to the present invention is intended to be included within the scope of this invention as defined by the following claims.

We claim:

1. A remoistenable adhesive composition comprising a suspension of discrete particles of a remoistenable adhesive material in a solution of a water-insoluble polyvinyl alcohol binder which contains from 85% to 40% of acetate groups and which is dissolved in a volatile solvent, said remoistenable adhesive material being selected from the group consisting of carbohydrates, animal glue and water activatable casein which are soluble in water and insoluble in said volatile solvent.

2. A remoistenable adhesive composition comprising a suspension of discrete particles of a remoistenable adhesive material in a solution of a water-insoluble polyvinyl alcohol binder which contains from 85% to 40% of acetate groups and which is dissolved in a solvent blend comprising water and a volatile water miscible solvent, said remoistenable adhesive material being selected from the group consisting of carbohydrates, animal glue and water activatable casein which are soluble in water and insoluble in said blend.

3. A remoistenable adhesive coated substrate comprising a substrate having adhered to at least one surface thereof a dried, consolidated coating comprising discrete particles of a remoistenable adhesive material selected from the group consisting of carbohydrates, animal glue and water activatable casein, which are bound to each other and to said substrate by a water-insoluble polyvinyl alcohol binder which contains from 85% to 40% of acetate groups.

4. A method for making remoistenable adhesive which comprises suspending discrete particles of a remoistenable adhesive material in a solution of a water-insoluble polyvinyl alcohol binder which contains from 85% to 40% of acetate groups and which is dissolved in a volatile solvent, said remoistenable adhesive material being selected from the group consisting of carbohydrates, animal glue and water activatable casein which are soluble in water and insoluble in said volatile solvent.

5. A method for making a remoistenable adhesive which comprises suspending discrete particles of a remoistenable adhesive material in a solution of a water-insoluble polyvinyl alcohol binder which contains from 85% to 40% of acetate groups and which is dissolved in a solvent blend, said solvent blend comprising water and a volatile water miscible solvent, said remoistenable adhesive material being selected from the group consisting of carbohydrates, animal glue and water activatable casein which are soluble in water and insoluble in said blend.

References Cited by the Examiner

UNITED STATES PATENTS

| | | | |
|---|---|---|---|
| 2,360,477 | 10/44 | Dahle | 260—91.3 |
| 2,640,816 | 6/53 | Germain | 260—29.6 |
| 2,917,396 | 12/59 | Agulnick | 260—17.4 |
| 3,104,179 | 9/63 | Prior | 260—8 |

OTHER REFERENCES

"Elvanol" (published by Du Pont Co., 1947), page 7.

WILLIAM H. SHORT, *Primary Examiner.*

LEON J. BERCOVITZ, *Examiner.*